(No Model.)
E. THOMSON.
ELECTRIC WELDING OF PIPES.
No. 438,658. Patented Oct. 21, 1890.
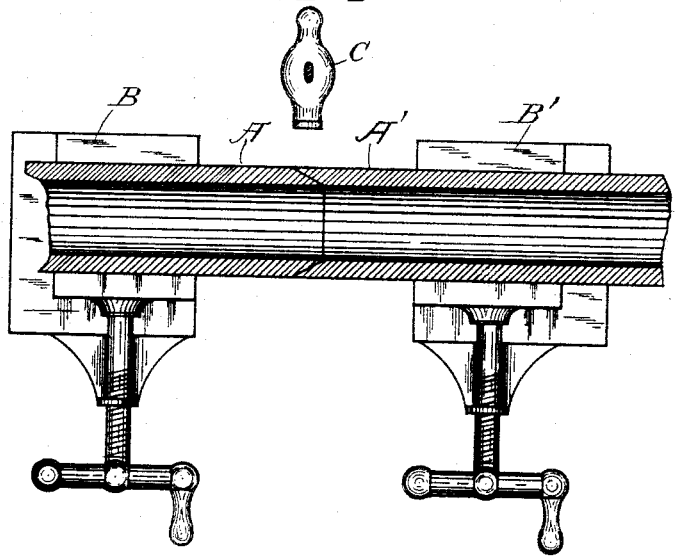
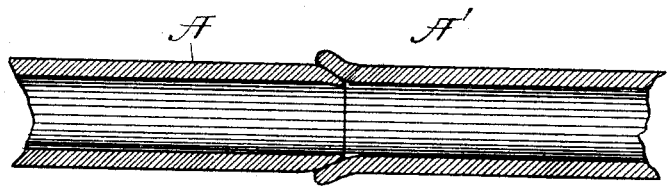

UNITED STATES PATENT OFFICE.

ELIHU THOMSON, OF SWAMPSCOTT, MASSACHUSETTS, ASSIGNOR TO THE THOMSON ELECTRIC WELDING COMPANY, OF MAINE.

ELECTRIC WELDING OF PIPES.

SPECIFICATION forming part of Letters Patent No. 438,658, dated October 21, 1890.

Application filed June 26, 1890. Serial No. 356,767. (No model.)

*To all whom it may concern:*

Be it known that I, ELIHU THOMSON, a citizen of the United States, and a resident of Swampscott, in the State of Massachusetts, have invented certain new and useful Improvements in Electric Welding of Pipes, of which the following is a specification.

My invention relates to a process of forming lap-welded joints between hollow pieces of any form in cross-section, but is especially applicable to the joining of tubular pieces, as sections of tubular pipe.

The invention consists in a process wherein the use of internal mandrels to prevent collapse or change of circumferential outline may be dispensed with, and involves, essentially, the heating of the lap-joint by an electrical current of sufficient volume for the purpose passed across the joint until the necessary plasticity or welding temperature is reached, followed (either while current is passing or after it is shut off) by a laterally-applied light impact, or quick pressure, consisting of rapid light blows a number of times repeated, each repeated application of impacts or pressures being properly graduated in force or duration, or both, not to produce collapse or contraction of the circumference of the work, the repeated applications finally resulting, however, in the completion of the weld.

My invention is based upon the fact or principle that if a hollow structure be heated at a certain portion of its length and upset or subjected to an upsetting action instead of collapsing interiorly it will bulge or swell exteriorly, so that the structure will have a larger diameter at the shortened or swelled portion, and in my present invention, where it is applied to the welding of pipes, the blows which are delivered at the weld or on the side of the pipe are graduated so as to simply contract this bulging or lateral spreading tendency, the hammering being delivered laterally so as to restore the metal back to its original position on the sides of the pipe, there being no tendency to collapse on account of the bulge on the interior of the pipe acting as a sustaining-support, but there being, if anything, an expansion outward. This arched interior is very important, as preventing collapse and enabling the blows of a hammer not too heavy to be delivered without really collapsing the pipe, but merely restoring it to its original outline.

I have herein illustrated my invention as applied to the production of a joint between two sections of piping circular in form; but, as will be obvious, the invention is applicable likewise to the formation of any joint between two hollow pieces of metal or any joint of general circumferential form wherein the work ordinarily would have to be supported from beneath by a mandrel to prevent change of form if it were heated so as to be soft, and were at the same time subjected to a force laterally applied and of sufficient amount to cause the collapse.

The laterally-applied impact or pressure may be produced by devices or tools of any desired character and whose shapes shall conform to the outline of the work or not, as desired. Thus, for instance, the welding force of an amount graduated as described and repeated may be laterally applied by means of a hammer, the face of which may be any usual form, though it would be possible in practicing my invention to use die or conforming devices moved by any desired means and having a motion so quick and so sudden that the force might be regarded somewhat in the nature of a blow. In this way the collapse and cooling of the metal at the joint are prevented. When devices of the character last mentioned are employed, they may be of such shape as to preserve the conformation of the joint or the work which it has before the operation, or the shape of the tools may be such as to modify the shape of the work at the joint.

In the accompanying drawings, Figure 1 illustrates, generally, my invention as carried out in the formation of a lap-welded joint between two sections of pipe. Fig. 2 illustrates a modification in the shape given to the ends of the pipe to permit the formation of a lap-welded joint.

Referring to Fig. 1, A A' indicate two sections of pipe, which are scarfed or beveled, as indicated, at their meeting ends, so as to lap upon one another.

B B' indicate the clamps or holding devices of some conducting material preferably, and forming the terminals of any desired means for supplying an electric current of large volume and comparatively low electro-motive force, which in passing through the work and across the joint shall heat the joint to the proper plasticity for union by the laterally-applied impact or pressure, such as hereinbefore described. For the sake of convenience the clamps or holders B B' may form the terminals of or be mounted upon a solid bar of copper constituting the secondary of a transformer or induction-coil, the primary of which is traversed by alternating electric currents, as described in patent of Hermann Lemp, No. 428,618, dated May 27, 1890, though in carrying out my invention it is immaterial what construction of apparatus is employed for furnishing the heating electric current and for holding the work.

C typifies as a hammer the device for applying the lateral impact or pressure repeated a large number of times and graduated, as described, so as not to collapse or distort the work. The work may be turned under the hammer or other device, or the hammer may be carried around the work.

The pieces A A', having been first given the shape shown at their heating ends, are placed in the clamps of the apparatus and are brought together with their meeting ends in abutment. The electric current is then caused to pass through or across the joint until the metal thereat assumes the proper plasticity or welding temperature, after which light blows are applied by means of the hammer C or other device to the joint around the whole periphery thereof until the union is fully effected. In performing this operation care is taken not to deliver blows sufficiently heavy to collapse the work.

The current may be allowed to flow during the operation in sufficient amount to keep the work up to the welding temperature during the application of the lateral impact or pressure, or, if desired, the current may be cut off during the hammering, and may be again applied when the work is cooled off to bring it up again to the proper temperature.

The chamfering of the ends of the tube may be done in any desired manner. Fig. 2 illustrates a modification in the manner of treating or preparing the ends of the tubes A A' before placing them in the clamps. Here the end of the tube A' is shown as having been expanded by any desired means and the end of the tube or section A as slightly contracted on its outer surface so that it may slip into the end of the section A'. The operation is the same as before described, the blows of a light hammer being applied so as to effect a union after the joint has been brought to plasticity by the passage of a heating-current.

It is quite obvious that a number of hammers might be employed simultaneously in the operation, such hammers being operated by any desired mechanism. By the process hereinbefore described I find that good joints may be made between the ends of tubes or other hollow pieces where a circumferential joint is required without the use of any internal mandrel, which has heretofore been used for sustaining the parts against collapse, thereby facilitating the operation and dispensing with the use of cumbersome and in some cases complicated contrivances.

It is important to use light hammers in the operation before described, as I have found that if heavy hammers are employed it is difficult to graduate the force of the impact, and in nearly every case where attention is not paid to this requirement the tube or pipe will collapse.

It is quite desirable in practice that the amount of metal exposed to heating between the clamps should be small, in order that the object may better sustain itself against any tendency to distortion or collapse from the application of the welding impact or pressure.

What I claim as my invention is—

The herein-described process of forming lap-welded joints between hollow metal pieces, as sections of pipe, consisting in heating the joint to the desired plasticity by passing an electric current through it, and then effecting the weld by laterally-applied light impact or pressure repeated a number of times and properly graduated, as described, not to contract or produce collapse in the work, as and for the purpose described.

Signed at Lynn, in the county of Essex and State of Massachusetts, this 21st day of June, A. D. 1890.

ELIHU THOMSON.

Witnesses:
JOHN W. GIBBONEY,
CHARLES E. MANN.